United States Patent [19]

Liu

[11] Patent Number: 5,191,714

[45] Date of Patent: Mar. 9, 1993

[54] PROTRACTOR

[76] Inventor: Wun-hui Liu, No. 2, Jiann Guon Lane, Jiunn Huon LI, Taichung, Taiwan

[21] Appl. No.: 886,901

[22] Filed: May 22, 1992

[51] Int. Cl.$^5$ ............................................. G01C 9/12
[52] U.S. Cl. .................................................... 33/391
[58] Field of Search ................. 33/391, 395, 402, 396, 33/397, 398, 399

[56] References Cited

U.S. PATENT DOCUMENTS 1,250,340  12/1917  Nordling .............................. 33/391
1,495,629  5/1924   Arthur ................................. 33/391
2,704,405  3/1955   Kupchak ............................. 33/400

FOREIGN PATENT DOCUMENTS 0066708  5/1980  Japan ..................................... 33/391

*Primary Examiner*—Harry N. Haroian
*Attorney, Agent, or Firm*—Browdy and Neimark

[57] ABSTRACT

A protractor has a main body, a frame and an indicating means. The main body comprises a vertically arranged flat board provided with two pressing edges attached integrally and respectively to upper and lower sides thereof and with a slot. Each of the pressing edges has a plane portion facing outwardly. The frame is disposed inside the slot and is provided with two positioning arms and an arcuate portion bridging the two positioning arms and having scales marked thereon. The indicating means has a shaft base mounted on the frame and a pointer mounted pivotally on a shaft mounted on the shaft base. The pointer has one end extending to reach the scales and other end provided with a balancing weight serving to keep the pointer to remain perpendicular to a horizontal surface, against which an object intended to be measured is set, at the time when the plane portion of the main body is placed on the measured surface of the object.

2 Claims, 3 Drawing Sheets

PROTRACTOR

BACKGROUND OF THE INVENTION

The present invention relates to a measuring device, and more particularly to a protractor used for measuring the angle of a slant surface of an object.

None of the prior art protractors is equipped to measure an angle formed by the surface of an object and a horizontal surface against which the object is set. As shown in FIG. 1, a level 10 of the prior art is composed of a main body 12 having a plane surface 14 and three air tubes 16. One of the three air tubes 16 is perpendicular to the plane surface 14, while the second air tube 16 is parallel to the plane surface 14. The third air tube 16 is arranged in such a manner that it forms an angle of 45 degrees with the plane surface 14. In using the level 10, the main body 12 of the level 10 is placed on the surface of an object intended to be measured. The angle formed by the measured surface of the object, which is set against a horizontal surface, is determined by the user of the level 10 by observing that the position of an air bubble 17 is at the center of the air tube 16. For example, if the air bubble 17 is located at the center of the air tube 16 perpendicular to the plane surface 14, the measured surface of the object is perpendicular to the horizontal surface against which the object is set. In other words, a right angle is formed by the measured surface and the horizontal surface in this instance.

The prior art level 10 described above is limited in that it measures only those angles which are consistent with the predetermined angles formed by the plane surface 14 and the air tubes 16. It is thus apparent that the level 10 can not be used to take the measurement of an angle that is different from any one of those predetermined angles formed by the plane surface 14 and the air tubes 16 of the level 10.

SUMMARY OF THE INVENTION

It is, therefore, the primary objective of the present invention to provide a protractor with means capable of measuring an angle of any shape formed by the surface of an object and a horizontal surface, against which the object is set.

In keeping with the principles of the present invention, the foregoing objective of the present invention is accomplished by a protractor, which has a main body comprising a flat board provided with a plane portion of a length and with a slot, a frame disposed inside the slot and provided with a graduated arc, and an indicating means disposed inside the frame and furnished with a pointer having one end extending to reach the graduated arc and other end which is provided with a balancing weight. In operation, the plane portion of the protractor is placed on the surface of an object intended to be measured. The user of the protractor can tell easily the angle formed by the measured surface of the object and the horizontal surface, against which the object is set, by observing the angle formed by the measured surface and the pointer which always remains perpendicular to the earth surface.

The foregoing objective and features of the present invention will be better understood by studying the following detailed description of a preferred embodiment of the present invention, in conjunction with the drawings provided herewith.

DETAILED DESCRIPTION OF THE PREFERRED EMBODIMENT

Figure 1:
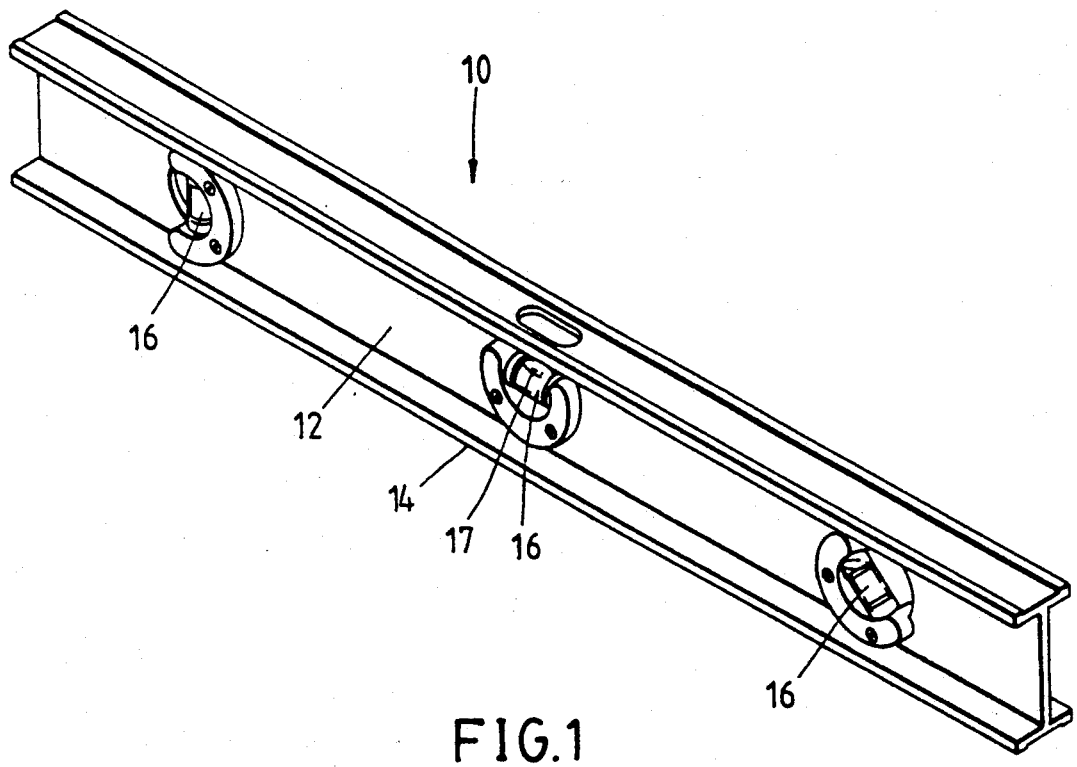
FIG. 1 shows a three-dimensional view of a level of the prior art.

Referring to FIGS. 2-5, a protractor 20 embodied in the present invention is shown comprising a main body 30, which in turn is provided with a first measuring rule 40, a second measuring rule 40', and two indicating means 50 corresponding respectively to the first and the second measuring rules 40 and 40'.

The main body 30 has a vertically arranged flat board 32 and two horizontally arranged elongate boards 33 which are attached integrally and respectively to upper and lower sides of the flat board 32. The elongate boards 33 are provided with the raised horizontal surfaces 34 having identical height. The upper elongate board 33 is provided with a rectangular hole 35 opposite to a V-shaped hole 36 of the flat board 32. The V-shaped hole 36 is in communication with the rectangular hole 35. Located at the two opposite sides of the open end of the V-shaped hole 36 are two horizontally arranged extended portions 31 and 362, each of which is provided with a threaded hole 37. In addition, the flat board 32 is provided with an open end which is spaced apart a predetermined distance from the V-shaped hole 36. Another V-shaped hole 36' is disposed in such a manner that its longitudinal length is rotated 90 degrees relative to the same length of V-shaped hole 36. (The V-shaped hole 36' has a longitudinal length that is greater than the longitudinal length of the V-shaped hole 36—to permit insertion measuring rule 40' into V-shaped hole 36'. The first measuring rule 40 comprises a frame 42 having two arms 43 which have an outer surface 431 with a slot 432 disposed therein. There is a graduated arc 46 bridging the two free ends of arms 43 and having thereon upper and side scales 47. Located at the center between the two ends of the arms 43 is a U-shaped seat 48 made integrally with arms 43. Each free end of the two arms 43 is provided with a lug 45 extending outwardly and having therein a through hole 44. In combination, the frame 42 corresponds to and is engaged in the V-shaped hole 36 via the rectangular hole 35 in such a manner that the lugs 45 make contact respectively with the extended portions 361 and 362. The slot 432 of arms 43 engages the rim of the V-shaped hole 36. A bolt 41 engages the threaded hole 37 via the through hole 44. The first measuring rule 40 further comprises a transparent shield 49 covering the graduated arc 46 and is fastened to arms 43 by means of a pin 491.

Figure 2:
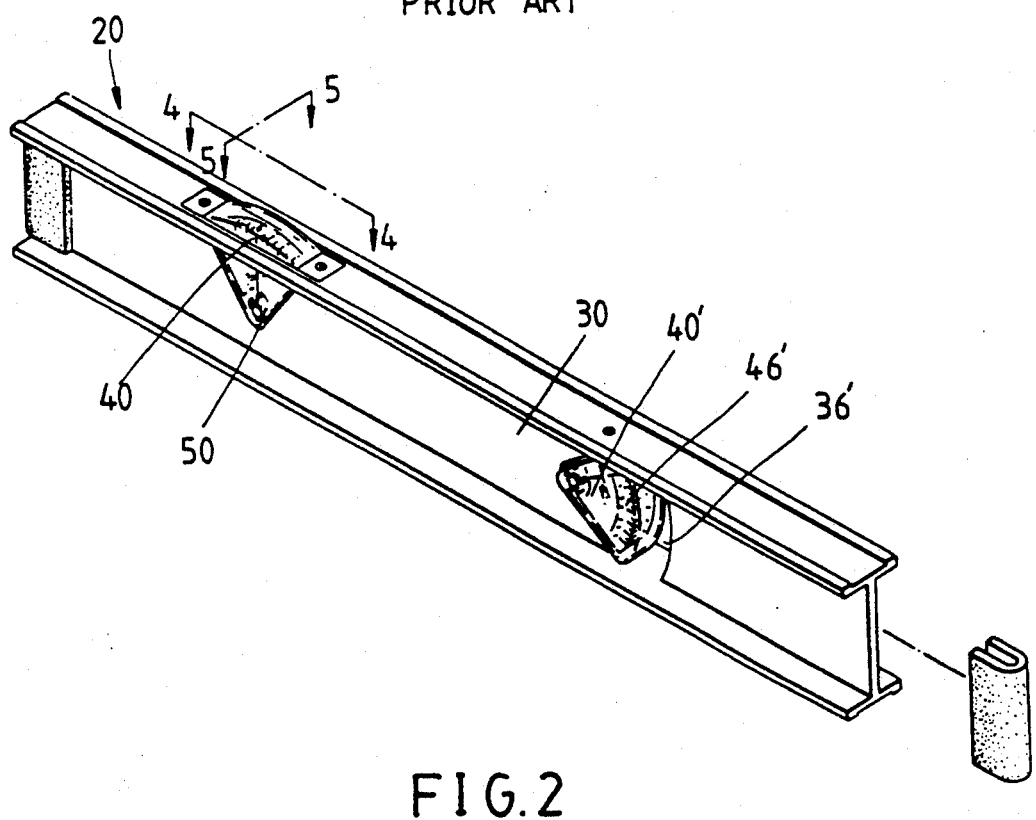
FIG. 2 shows a three-dimensional view of a protractor embodied in the present invention.
Figure 3:
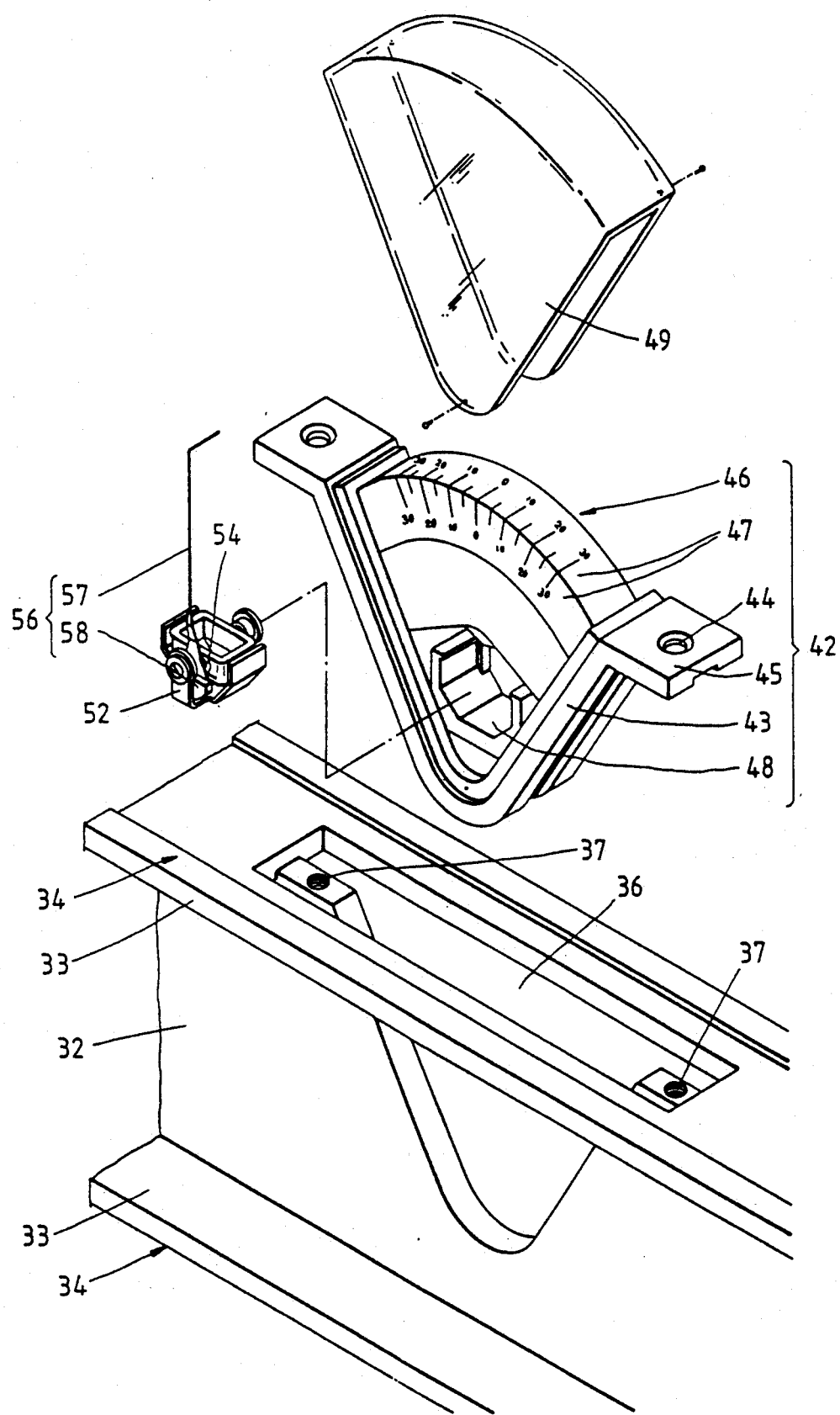
FIG. 3 shows an exploded view of the protractor of the present invention.
Figure 4:
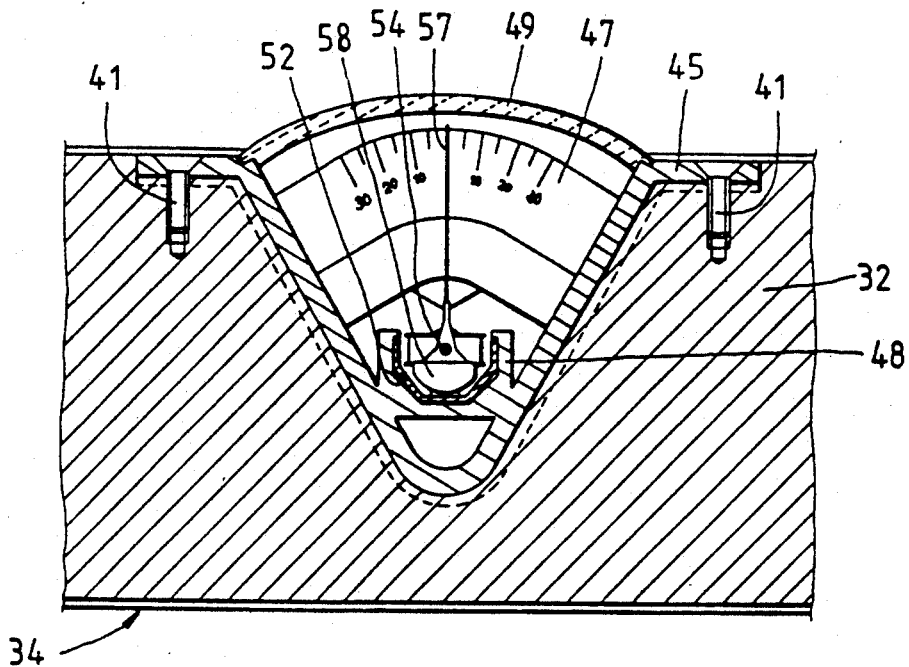
FIG. 4 shows a sectional view of a portion taken along the line 4—4 as shown in FIG. 2.
Figure 5:
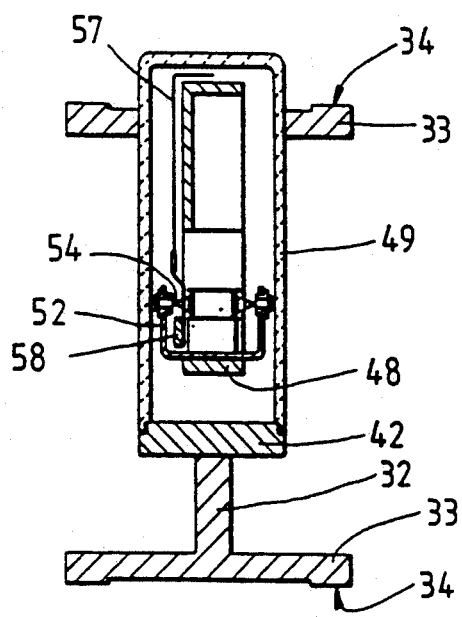
FIG. 5 shows a sectional view of a portion taken along the line 5—5 as shown in FIG. 2.

The second measuring rule 40' is generally similar in structure to the first measuring rule 40. In combination, the second measuring rule 40' is lodged in the V-shaped hole 36' of the flat board 32. As shown in FIG. 2 hole 361 is larger than frame 40' to permit its insertion into main body 30.

Each of the two indicating means 50 consists of a shaft base 52 fastened securely to the base 48, a shaft 54 mounted on the shaft base 52, and a pointer 56 mounted pivotally on the shaft 54 and provided with a pointing end 57 and a balancing end 58. Pointing end 57 of first measuring rule 40 is bent at an angle over upper scale 47 so that it can be observed from the upper side of upper elongated board 33.

In combination, the first and the second measuring rules 40 and 40' are arranged respectively in the first and the second V-shaped holes 36 and 36' and are further secured in place by means of screws 41. Each of indicating means 50 is mounted securely on the base 48 of the frame 42 in such manners that the pointing end 57 of its pointer 56 extends to reach the scales 47 of the first graduated arc 46 or the second graduated arc 46', and that the pointing end 57 of its pointer 56 always remains perpendicular to the earth surface by means of the balancing end 58 of the pointer 56.

In operation, the plane portion 34 of the lower elongated board 33 is set against the surface of an object (not shown in the drawings) intended to be measured. The user must wait until the oscillating pointer 56 stops swinging before he or she tries to take the reading of the angle formed by the measured surface of the object and the horizontal surface, against which the object is set. Furthermore, the protractor 20 of the present invention is quite handy for measuring the angles formed respectively by multiple surfaces of an object and a horizontal surface, against which the object is set, by virtue of the fact that the protractor 20 of the present invention is provided with first and second measuring rules 40 and 40', which have graduated arcs 46 and 46' rotated 90° to each other.

The embodiment of the present invention described above is to be considered in all respects as merely illustrative and not restrictive. According, the present invention may be embodied in other specific forms without deviating from the spirit thereof. The present invention is therefore to be limited only by the scope of the hereinafter appended claims.

What is claimed is:

1. A protractor comprising;
    a main body having a center beam,
    an upper elongated board and a lower elongated board respectively integrally engaged to an upper edge and a lower edge of said beam,
    said upper elongated board and said lower elongated board having a width greater than a width of said center beam,
    said upper elongated board having a rectangular hole communicating with a first V-shaped hole in said beam,
    a V-shaped frame having two arms joined together at a first end of each of said two arms,
    a slot on an outer surface of said each of said two arms,
    an arc piece having a first scale marked on a side of said arc piece and a second scale marked on a top of said arc piece,
    said arc piece engaged to a second end of said each of said two arms,
    said V-shaped frame having a seat integrally engaged between said first end of each of said two arms,
    said V-shaped frame fastened in said rectangular hole and said first V-shaped hole so that a rim of said first V-shaped hole extends into and engages said slot of said each of said two arms,
    an indicating means having a shaft base engaged in said seat,
    a pointer pivotally mounted on a shaft engaged on said shaft base,
    said pointer having a first end extending to reach over said first scale and said second scale and a second end with a balancing weight.

2. The protractor of claim 1, wherein said beam has a second V-shaped hole having an opening located in a direction along the longitudinal axis of said beam, said second V-shaped hole having a dimension greater than a dimension of said frame so as to permit a second said V-shaped frame to be placed in said second V-shaped hole.

* * * * *